Feb. 21, 1967 E. D. KITTREDGE 3,305,062

TRANSLATION DEVICE HAVING MIRROR IMAGE KEYBOARD

Filed April 12, 1965 10 Sheets-Sheet 1

INVENTOR
Edward D. Kittredge
by Wolf, Greenfield & Hieken

In lieu of underlining the second level symbols, they can be printed with a shade or color contrast, or with striation, i.e., N for N, ect.

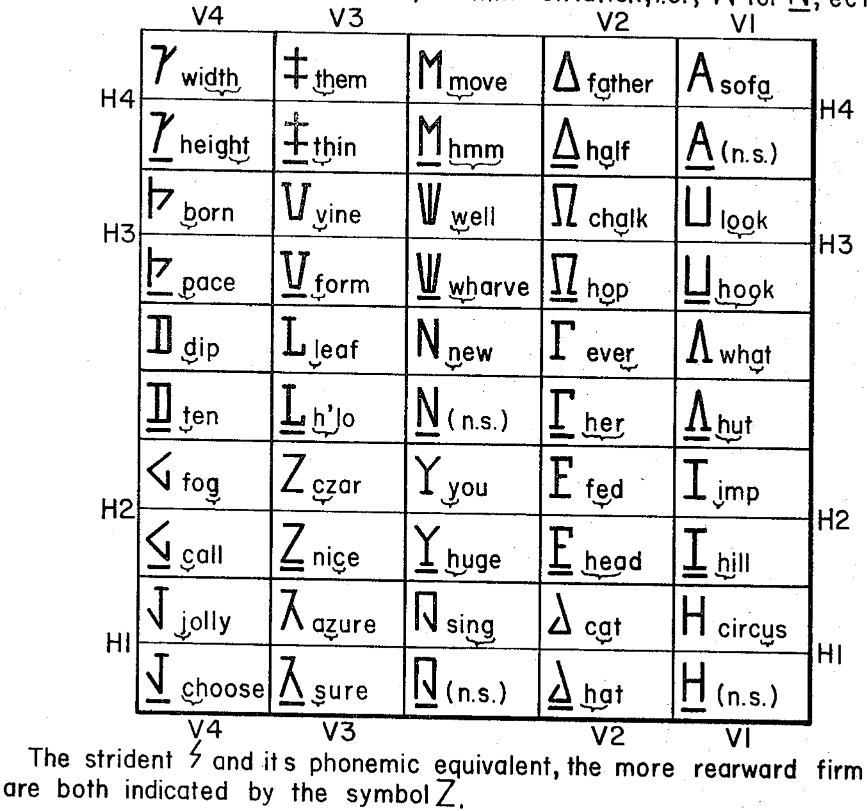

The strident and its phonemic equivalent, the more rearward firm C, are both indicated by the symbol Z.

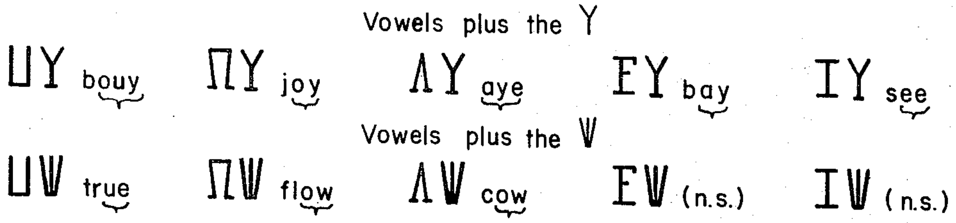

Because of the breadth of the table, it was no circus for my father to wrestle it through the door, but turning it ever so slightly, first in one direction then another, he was successful in maneuvering the ancient hulk into our kitchen at last. (201 symbols)

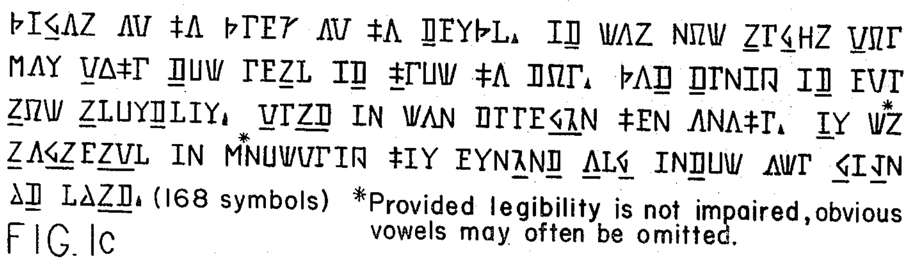

(168 symbols) *Provided legibility is not impaired, obvious vowels may often be omitted.

FIG. 1c

For Australian or "Bow Bells" matrix shown, use ΔY for ∈Y; modify value of Δ to an Π of lower resonance and more "I" color; and for the "ah" as in father use a double vowel, such as, ΛΛ or ΛΛ.

TRANSLATION DEVICE HAVING MIRROR IMAGE KEYBOARD

Filed April 12, 1965

10 Sheets-Sheet 4

INVENTOR
Edward D. Kittredge
by Wolf Greenfield & Sacks

Edward D. Kittredge INVENTOR
by Wolf, Greenfield & Hieken

Feb. 21, 1967 E. D. KITTREDGE 3,305,062

TRANSLATION DEVICE HAVING MIRROR IMAGE KEYBOARD

Filed April 12, 1965

10 Sheets-Sheet 6

Edward D. Kittredge INVENTOR by Wolf, Greenfield & Hieken

Feb. 21, 1967 E. D. KITTREDGE 3,305,062

TRANSLATION DEVICE HAVING MIRROR IMAGE KEYBOARD

Filed April 12, 1965 10 Sheets-Sheet 7

Feb. 21, 1967 E. D. KITTREDGE 3,305,062

TRANSLATION DEVICE HAVING MIRROR IMAGE KEYBOARD

Filed April 12, 1965

10 Sheets-Sheet 8

TRANSLATION DEVICE HAVING MIRROR IMAGE KEYBOARD

INVENTOR
Edward D Kittredge
by
Wolf, Greenfield & Hieken

Feb. 21, 1967 E. D. KITTREDGE 3,305,062

TRANSLATION DEVICE HAVING MIRROR IMAGE KEYBOARD

Filed April 12, 1965 10 Sheets-Sheet 10

NOTE: For machine without striating means, use – for ≡.

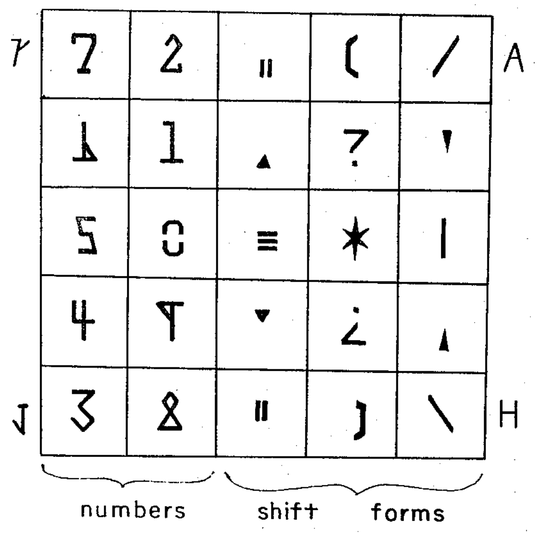

FIG. 15A

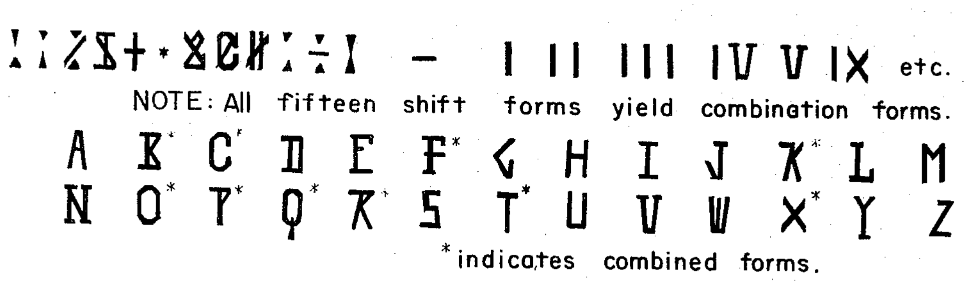

FIG. 15B

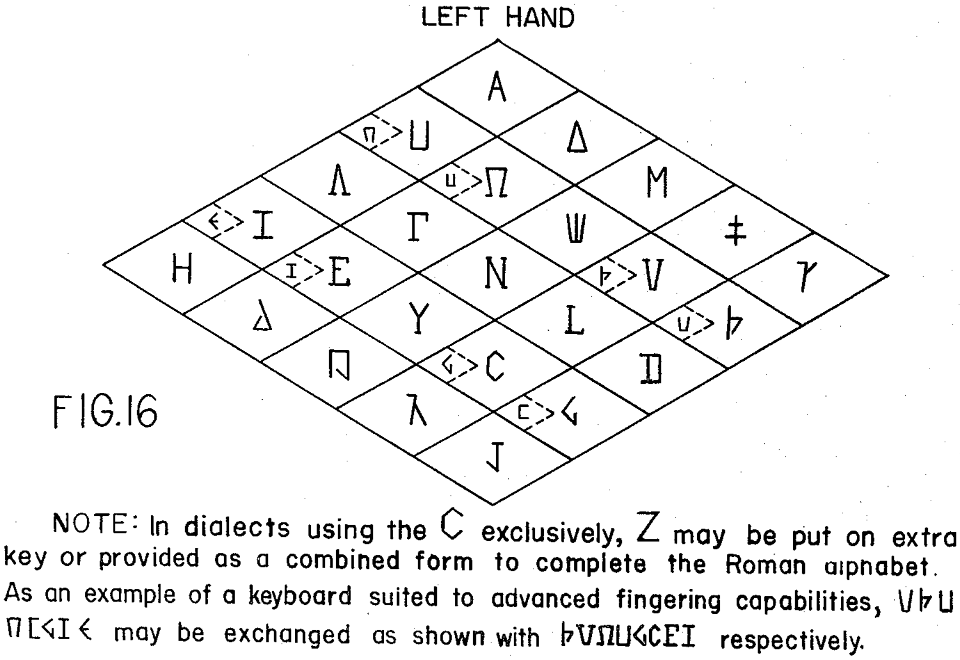

FIG. 16

NOTE: In dialects using the C exclusively, Z may be put on extra key or provided as a combined form to complete the Roman alphabet. As an example of a keyboard suited to advanced fingering capabilities, V⊦U Π⊏‹I‹ may be exchanged as shown with ⊦VΠU‹CEI respectively.

United States Patent Office 3,305,062

Patented Feb. 21, 1967

3,305,062

TRANSLATION DEVICE HAVING MIRROR IMAGE KEYBOARD

Edward D. Kittredge, Hollis, N.H. (Wentworth Road, Portsmouth, N.H. 03801)

Filed Apr. 12, 1965, Ser. No. 447,288
20 Claims. (Cl. 197—1)

This invention relates broadly to sound translation, and more particularly to the translation of speech into writing. Such writing may be achieved in a standard English text as typed with standard English spelling and punctuation at a pace, by means of the invention, equalling that of the speaker. Transcription, which is essentially the same process but utilizes intelligence drawn from sources other than sound, such as notation of one sort or another to be typed in standard text, may in keeping with skills gained by the operation of the invention run considerably ahead of such rates as would as a rule be characteristic of, say, translating what a radio announcer had to say into writing as he said it. Hence, of the two closely indentified processes, transcription may in most cases be thought of as more efficient than translation, but there are means readily available, such as recording speech and playing it back at a faster but still intelligible rate, to bring the one skill up to the standard of the other in this regard. More particularly the invention concerns equipment novel to the process of transcription and translation by the specific employment of a novel high-speed means of conveying information through a dual keyboard reflecting the bilateral symmetry of the hands. Moreover, as a form of this invention this novel keyboard provides a means of using either a standard alphabet or special system of symbols, such as those of the isomorphic system devised especially for the more efficient operation of the machine, so as to facilitate processing information by transcription or translation into written form continuously, if so desired, and without delays.

The standrad keyboard contains one key for each letter of the alphabet, and approximately half the keys are controlled by each hand of the operator. Therefore, typing speed is achieved by the operator's ability to actuate the keys one at a time in sequence on the two unlike portions, left and right, of the keyboard.

Because such actuation thus requires responding letter-by-letter one at a time in sequence, it precludes taking advantage of the operator's ability to respond coherently in terms of groups, more particularly pairs, of letters or symbols.

An important object of this invention is to achieve rapid sound translation in a form easily translatable back into corresponding sound.

One important object of this invention is to provide a transcribing machine which enables the operator to achieve a standard typed script and/or specialized copy, such as that of a ledger, at faster rates than are now possible with standard machines.

Another object is to provide keyboard means which take advantage of the ability of an operator to think and act in terms of groups of symbols as well as in sequence, such responses being in conformity with and corresponding to standard English text if so desired.

Still another object of the invention is to achieve the two preceding objects by employing a format of symbols very close to that of a standard typewriter.

According to the invention, and as pertains to the isomorphic format, the sounds are roughly classified according to the source of their origin in the human sound-producing system, such sounds being assigned designating symbols. These related sound designators are grouped together in the keyboard to facilitate accurate symbol selection in response to the occurrence of words. Preferably such designating symbols are so designed that the act of observing a sequence of symbols will enable a reader with only moderate training to understand the intelligence conveyed by the original sequence translated or transcribed.

To accomplish these and other objects, this invention includes among its features a keyboard having two like halves, one half being operated by the left hand and the other by the right, so that two symbols may be alternately or simultaneously selected, one with the left hand and one with the right hand. Moreover, each hand has under its control a complete set of keys from which may be selected any of the letters or symbols without any dependence upon the other set. In addition, certain auxiliary keys, such as shift, space and back-space are duplicated on each half of the keyboard for control of their respective functions by either hand.

These and other objects and features of this invention along with its incident advantages will be better understood and appreciated from the following specification read in connection with the accompanying drawing, in which.

Figure 2:
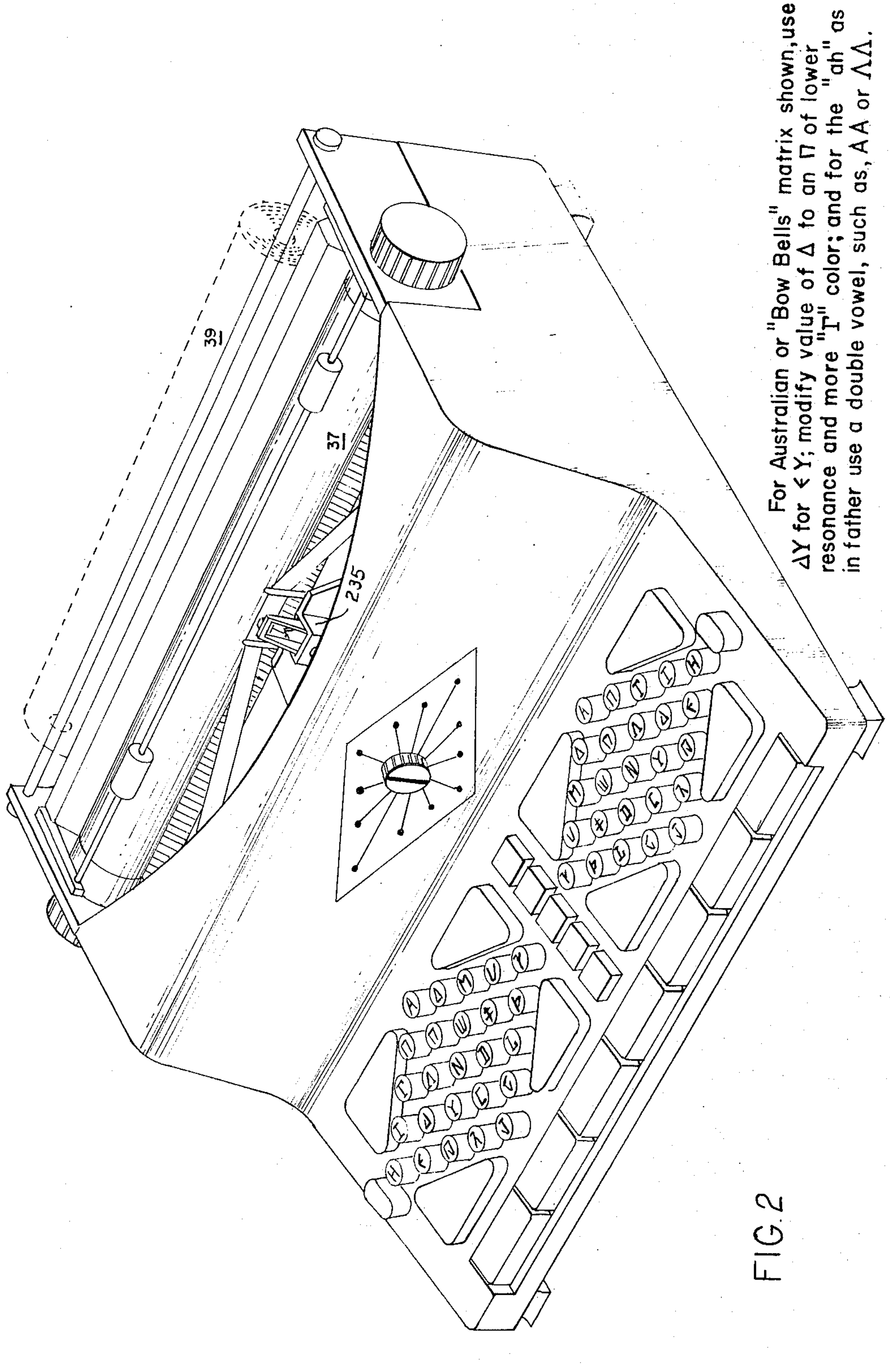
Figure 3:
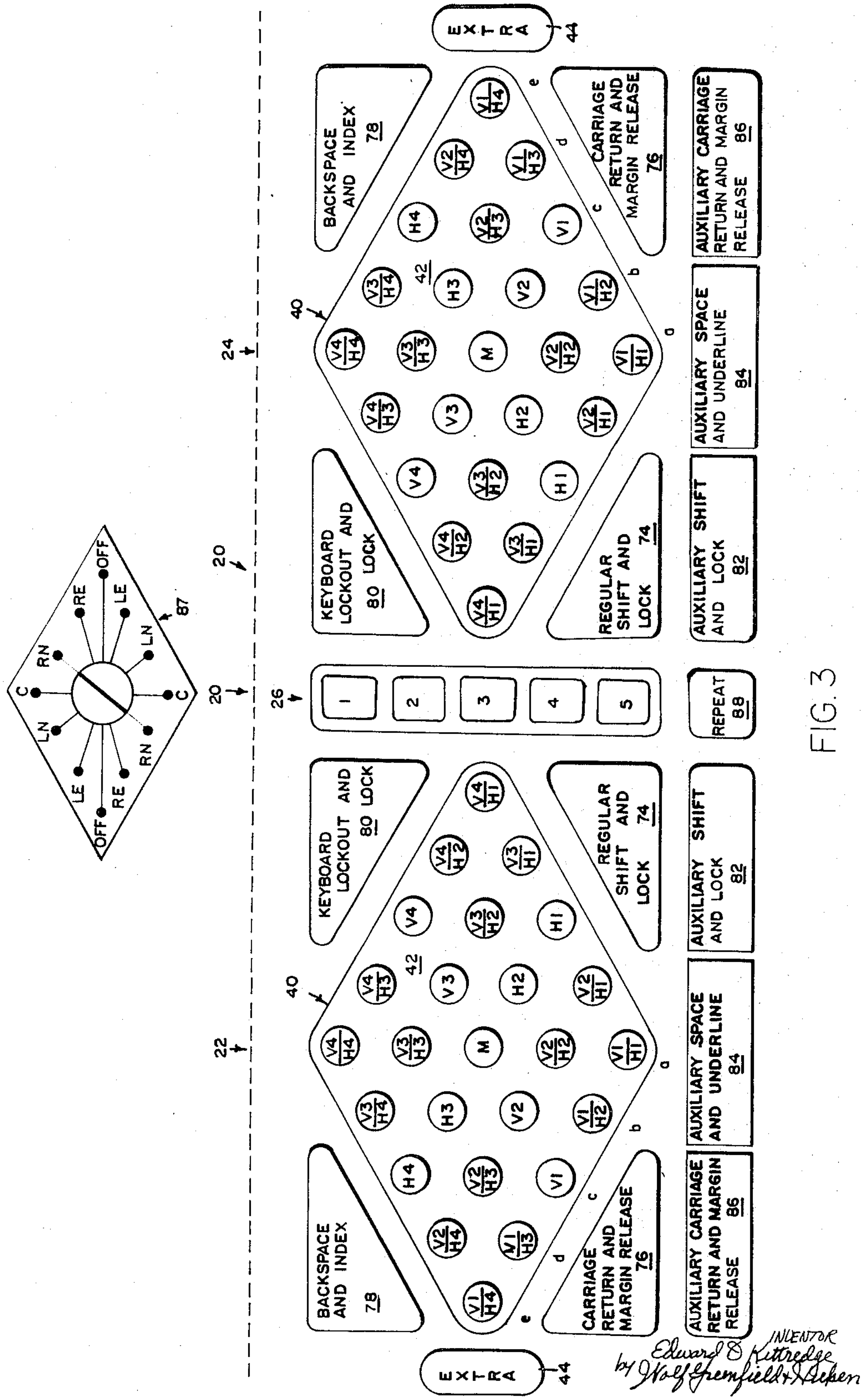
Figure 4:
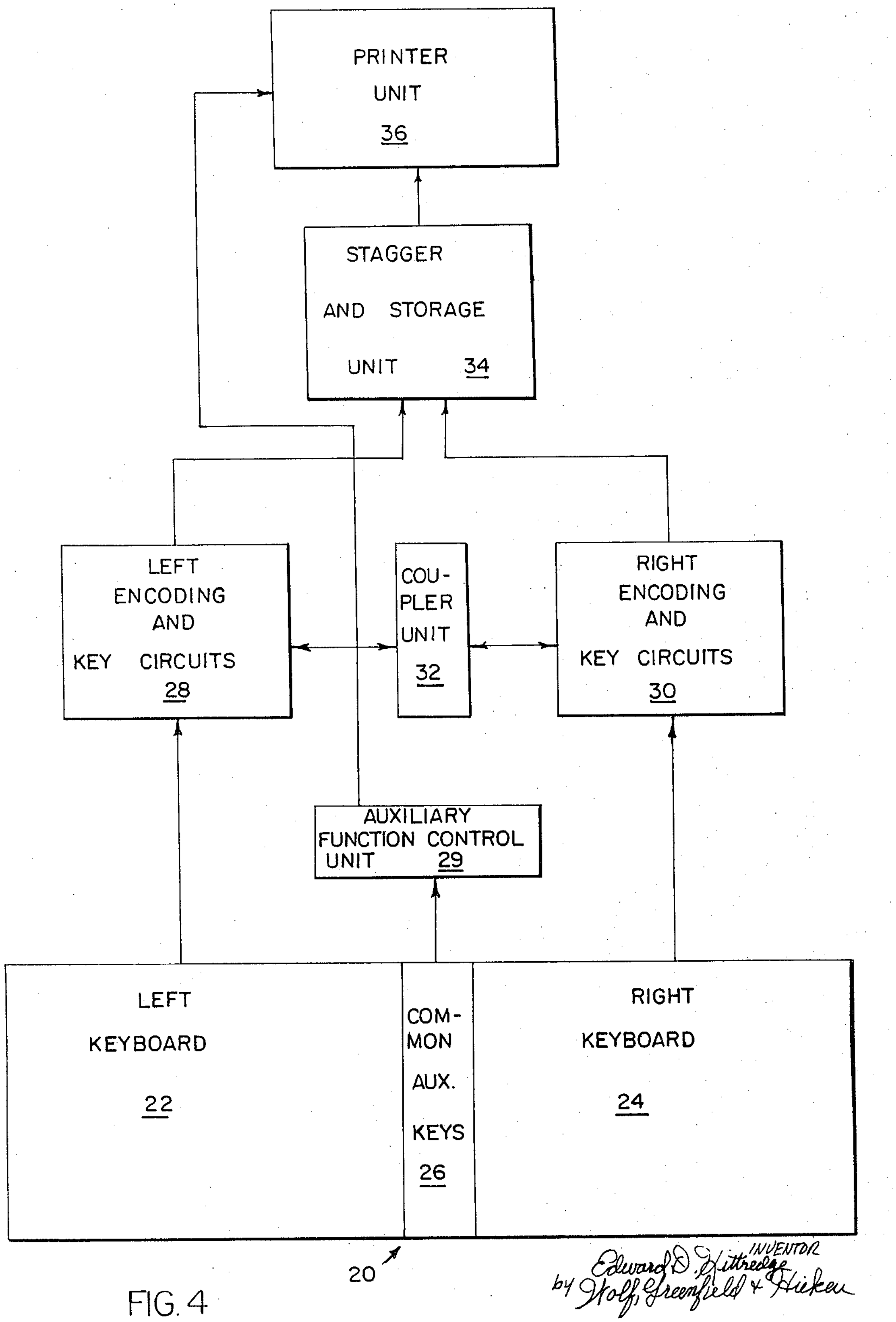
Figures 5A, 5B, 5C, 6, 8:
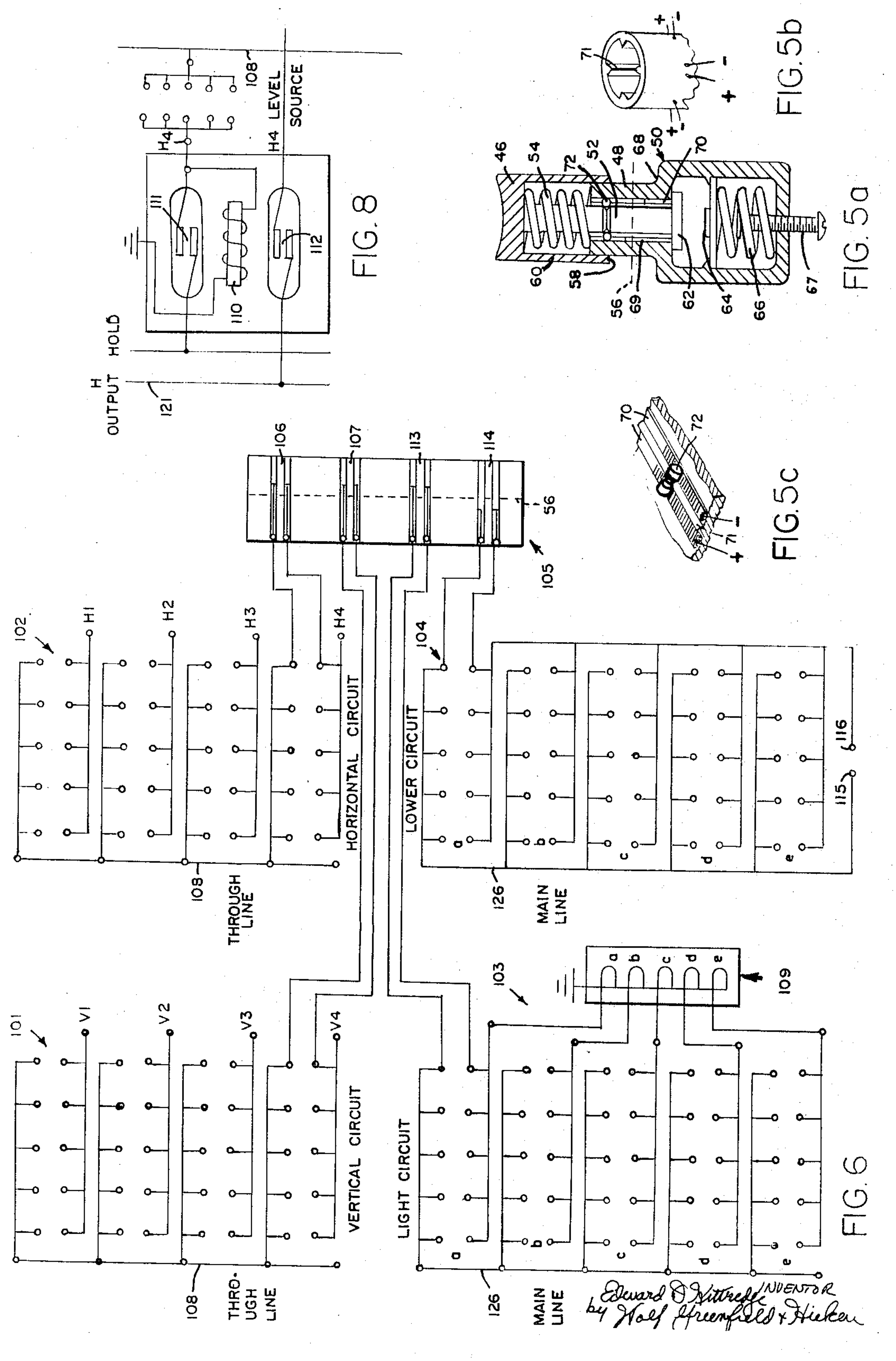
Figure 7:
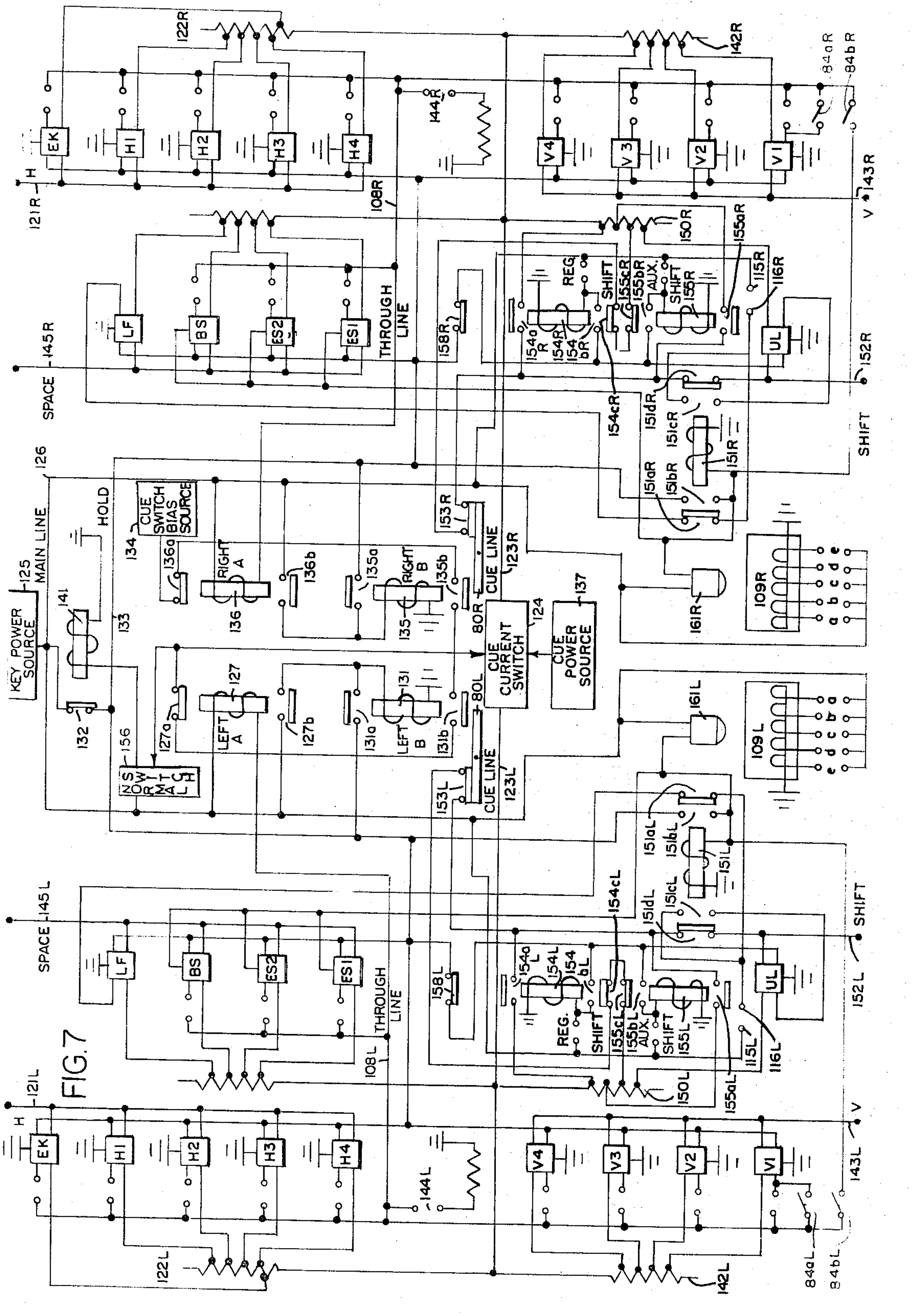
Figure 9:
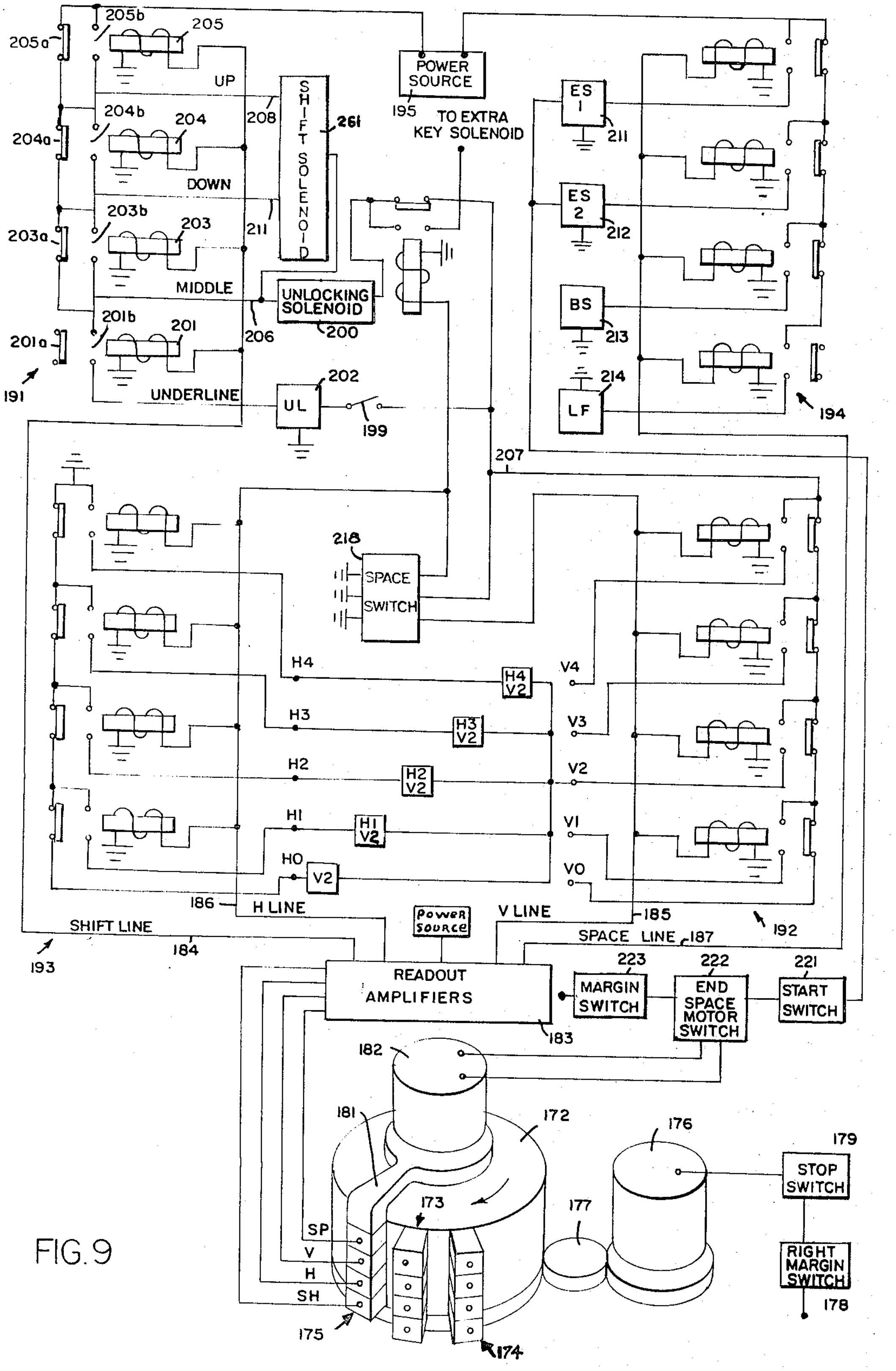
Figures 11, 12, 13, 14:
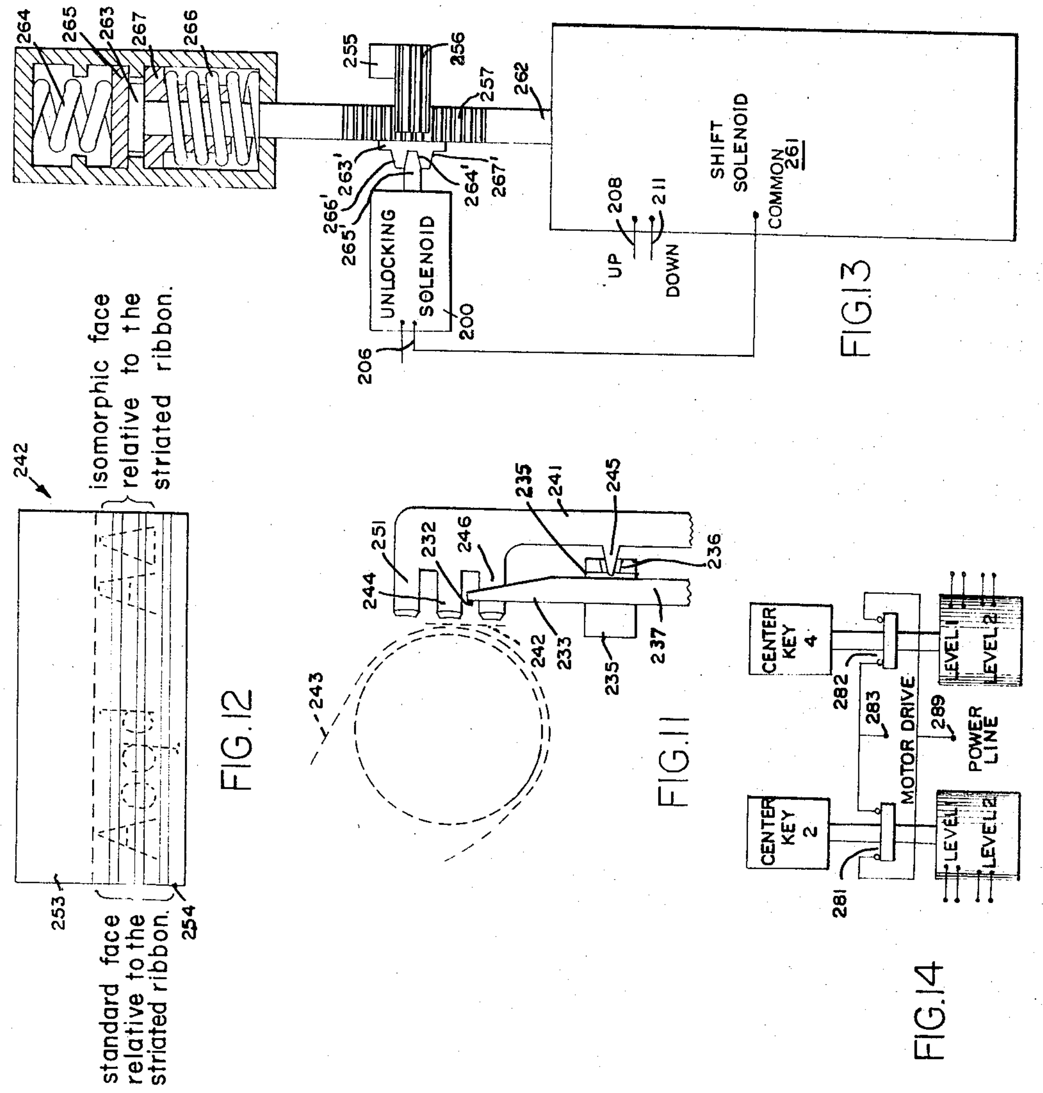
Figure 10:
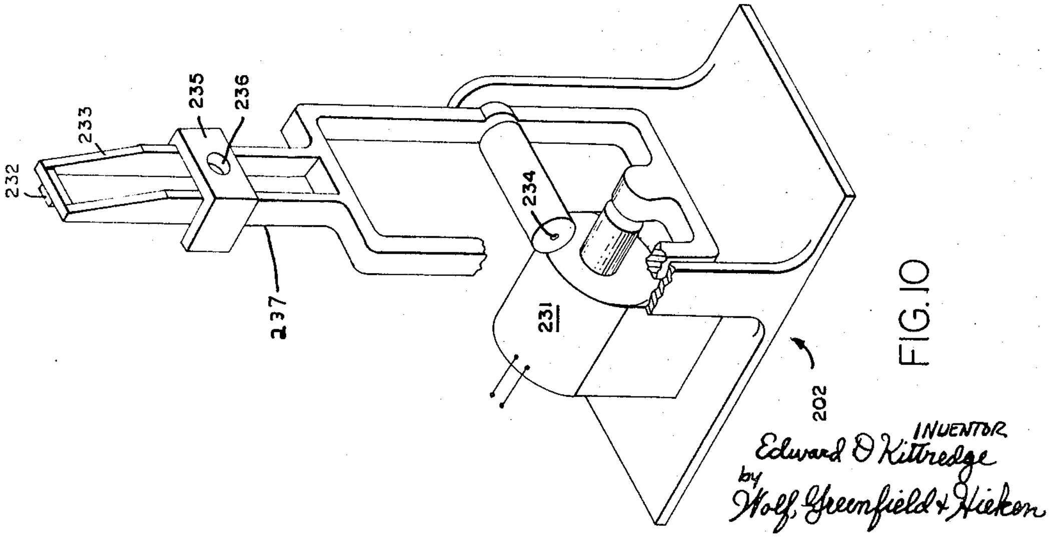

FIG. 1C defines and illustrates the use of sound-representative symbols;

FIG. 2 is a perspective view of a transcribing machine constructed in accordance with the invention having like keyboards side-by-side;

FIG. 3 is an enlarged view of the like side-by-side keyboards and ancillary controls;

FIG. 4 is a block diagram illustrating the logical arrangement of a system according to the invention for converting keyboard selections into corresponding output impressions;

FIG. 5A is a cross-sectional view of a preferred form of a keyboard key and FIGS. 5B and 5C show details of the roller contact switch;

FIG. 6 shows the logical arrangement of switch terminals closed by the different primary keys;

FIG. 7 is a combined block-schematic circuit diagram illustrating means for encoding keyboard selections into corresponding signals;

FIG. 8 is a schematic circuit diagram of a gating circuit suitable for use in the encoding system of FIG. 7;

FIG. 9 is a combined block-pictorial-schematic circuit diagram of a decoding system responsive to the encoded signals provided by the encoding system for effecting a response designated by the encoded signals;

FIG. 10 shows an exemplary underlining unit;

FIG. 11 shows the relationship between elements including a typical keybar and the underline;

FIG. 12 shows a portion of a ribbon for impressing selectively solid and striated symbols;

FIG. 13 shows an exemplary shift unit;

FIG. 14 shows a keying arrangement to prevent an actuating motor from simultaneously receiving contradictory instructions;

FIG. 15A shows the symbols obtained by using the regular shift with the isomorphic format;

FIG. 15B shows various typical symbols which may be obtained with the isomorphic font; and FIG. 16 shows a preferred arrangement of isomorphic symbols on the left keyboard according to the invention, positionally the mirror image of the format on the right keyboard.

Figure 1B:
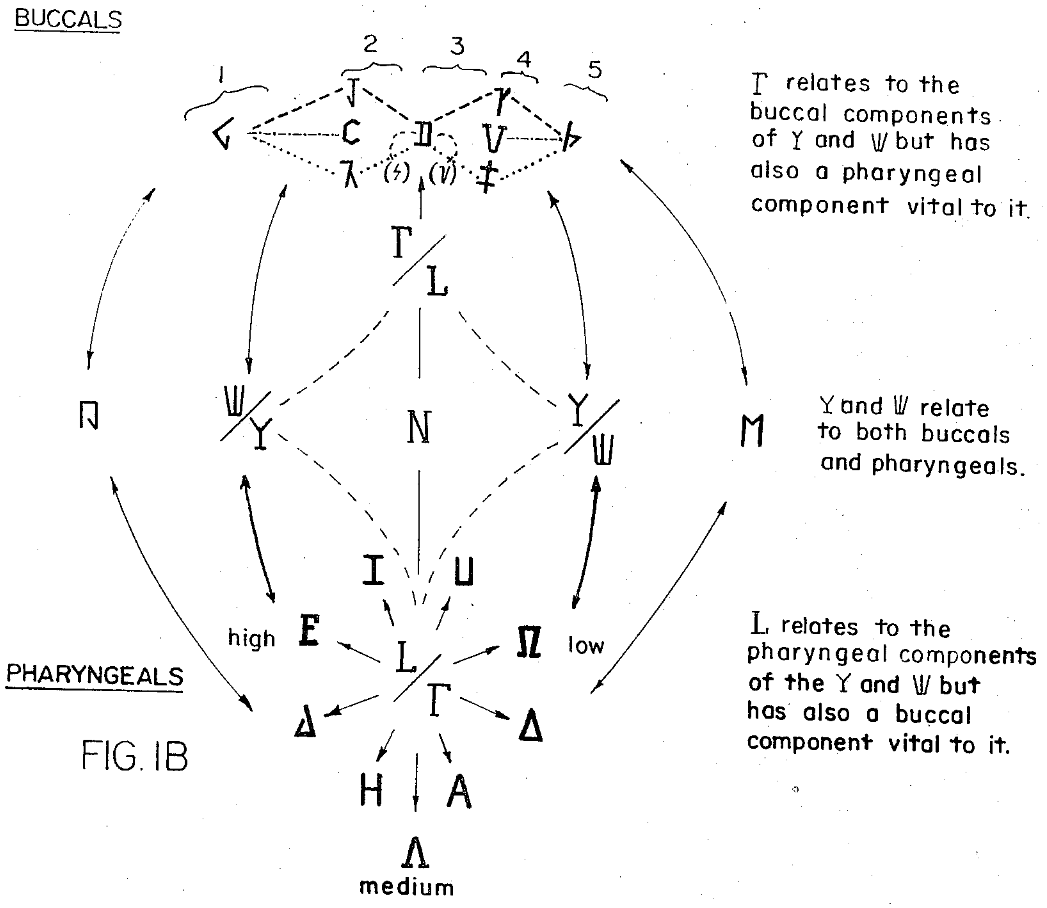
FIG. 1B is a representation of a preferred system of classifying sounds according to the invention.
Figure 1A:
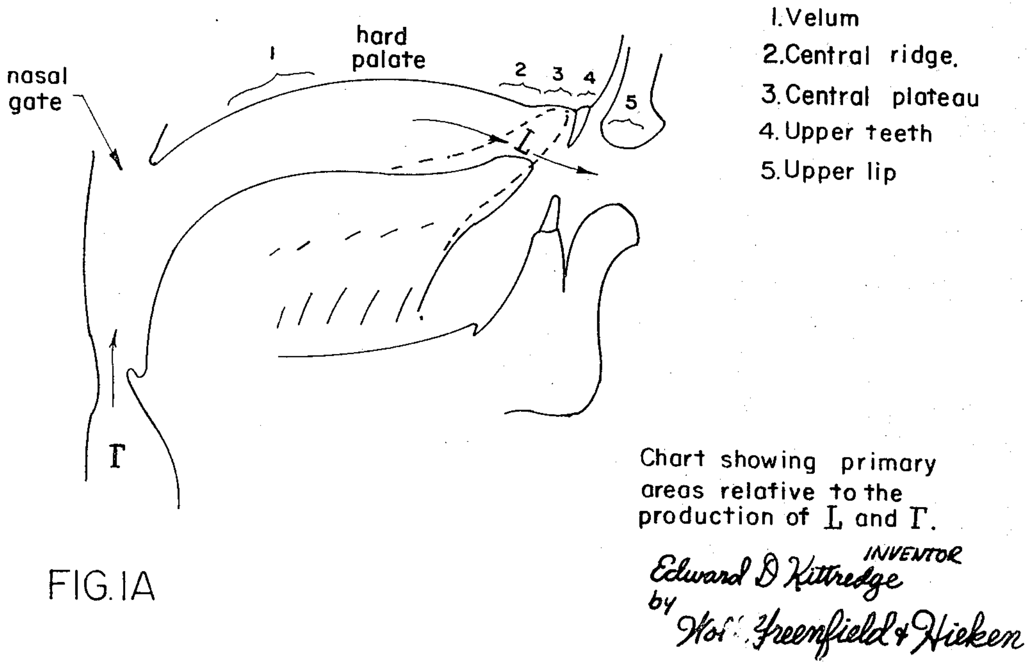
FIG. 1A is a pictorial representation of the cross section of the major human sound-producing regions.

With reference now to the drawings and more particularly to FIG. 1 thereof, there is shown in FIG. 1A a pictorial representation of the cross section of the major human sound-producing regions and in FIG. 1B a representation of a preferred isomorphic system of classifying sounds according to the invention. In FIG. 1B the vowel sounds are arranged at the bottom in the order of decreasing pitch and at the top in the order back-to-front of the primary consonantal sounds. The nasals and the glides are shown in the middel. FIG. 1C defines sound-representative symbols, including the symbols in FIG. 1B, in terms of portions of well-known words above the brace together with a representative passage in English denoted by the symbols according to the invention. Certain symbols designated (N.S.), meaning non-standard, are not associated with a particular sound normally encountered in the English language and may, to some extent, be used to designate other sounds commonly encountered in foreign languages.

The square matrix of 25 symbols correspond to respective keys on a keyboard to be described below. It is convenient to designate four of the five rows and columns (excluding the middle row and column) by the letters H and V, respectively, with an appended number. If the middle row and column are each regarded as 0, each of the 25 symbols in the matrix is uniquely designated by the row and column number where it is located.

The symbolic representation of the sounds has a number of advantages. First, the same information is recorded with significantly fewer symbols than is required in standard alphabetical notation. Second, the passage in symbols according to the invention may be read back phonetically by a reader having relatively little training, even if he is not too familiar with the English language. An operator not familiar with English spelling who writes according to the invention with these symbols may thus transliterate English and even read back what was said so that a person familiar with English could grasp the meaning of the words being repeated. With isomorphs reflecting another language, the process may be similarly effected.

Referring to FIG. 2, there is shown a perspective view of a manually operated machine according to the invention which takes advantage of the ability to respond in a manner novel to typewriting by providing a pair of like keyboards side-by-side so that the operator can either alternately or simultaneously select a pair of symbols from the left and right set. The side-by-side keyboards and ancillary controls are shown in greater detail in FIG. 3, but before considering this apparatus, it is helpful to first consider the arrangement of a system according to the invention for permitting the selection of a coherent pair of symbols for imprinting.

Referring to FIG. 4, there is shown a block diagram illustrating the logical arrangement of a system according to the invention for converting koyboard selections into corresponding impressions. Keyboard 20 includes a left keyboard 22, a right keyboard 24, and a center group of keys 26 which may be actuated by either hand for selecting auxiliary functions.

The left keyboard 22 and right keyboard 24 respectively control the left encoding and key circuits 28 and the right encoding and key circuits 30. These circuits convert a key selection into a corresponding encoded electrical output signal. A coupler unit 32 coacts with the left encoding and key circuits 28 and the right encoding and key circuits 30 to cause the signals encoded therein, which may be selected alternately or simultaneously by left keyboard 22 and right keyboard 24, to be deliverd simultaneously to stagger and storage unit 34. Stagger and storage unit 34 responds to the encoded signals by providing power signals to printer unit 36 to activate an impression of the signal designated by the corresponding encoded signal.

The auxiliary function control unit responds to the selection of various auxiliary functions to provide control signals for effecting these functions in the printer unit.

Referring to FIG. 2, there is shown a perspective view of apparatus according to the invention including the system of FIG. 4 which may produce the impression shown at the bottom of FIG. 1C. The provision of the two side-by-side keyboards to facilitate simultaneous selection of two different symbols for printing takes advantage of the human ability to think and respond in terms of groups of symbols to accelerate the effective speed of selecting and impressing symbols in a desired sequence. Still another advantage resides in the convenient arrangement of the keys to facilitate rapid and accurate selection of a desired symbol for impressing.

The platen 37 may accept a sheet of paper for receiving impressions. Alternatively, a roll of paper 39 may be continuously fed around platen 37 to facilitate uninterrupted transcription for long periods of time.

Referring more particularly to FIG. 3, the left keyboard 22 and right keyboard 24 are side-by-side mirror images of one another so that corresponding fingers on the left and right hands select corresponding symbols on the left and right keyboards 22 and 24. Each keyboard comprises twenty-five keys arranged in an equilateral rhombus. The keys form five rows sloping upward from the downward sloping column nearest the keyboard sides and five columns sloping downward from the top row sloping upward from the keyboard sides. It is convenient to designate each key, except the keys in the middle row and middle column, by the letter V and a and a subscript designating the column in which the key is located and the letter H and a subscript designating the row in which the key is located. The key in the middle is designated by the letter M, the other keys in the middle column are designated by the letter H and a subscript identifying the row in which that key is located, and the other keys in the middle row are designated by the letter V and a subscript identifying the column in which that key is located. This designation of keys is helpful in understanding the encoding signals produced upon depression of a particular key and correlating a format of symbols, such as those shown in FIG. 1C, to the respective primary keys. These twenty-five primary keys 40 may be mounted on a platform 42 raised slightly from the plane of the other keys, an extra key 44 may be placed to the outside of the primary keys 40 should it be desired to have a key for each of the twenty-six letters of the standard English alphabet.

Referring to FIG. 5A, there is shown a sectional view through an axial plane of a typical primary key. Each of the twenty-five primary keys 40 and the extra key 44 are specifically designed to be depressed to either of two levels, each of which levels creates a different response. In FIG. 5A a typical primary key has a cap 46 which telescopically fits about a collar 48 forming part of a contact housing 50. A downwardly extending stem 52 carried by the cap extends through the collar 48. A first level spring 54 surrounds the stem 52 and urges the cap 46 upwardly to the position shown in FIG. 5A. The first level spring 54 also serves as the primary and sole opposition of the cap 46 in its movement downwardly to the first level of depression suggested by the broken line 56. When the cap 46 moves downwardly so that the lower edge 58 of its skirt 60 reaches the level of broken line 56, the head 62 of the stem 52 engages a disc 64 biased to the position shown by a second level spring 66 disposed beneath it. The stem 52 may move downwardly below the first level to a second level by overcoming the additional resistance provided by the second level spring 66. Thus, the second level spring 66 adds an additional load against the cap 46 when it is moved downwardly to the second level wherein the lower edge 58 of the skirt 60 is in substantial contact with the shoulder 68 of the contact housing 50. The second level spring 66 serves to alert the operator that the cap 46 has been depressed to the first level and prevents accidental depression of the cap to the second level. When the operator desires to lower the cap to the second level, conscious action is required to overcome the second level spring 66. Screw 67 serves to delimit or eliminate second level.

A first level contact pair 69 and a second level contact pair 70 are disposed in the collar 48 of the contact housing 50. Those contact pairs are positioned to be engaged by respective movable roller contacts like 72 as best seen in FIG. 5B which travel with the cap 46. When the cap 46 is depressed to its first level, a roller contact movable with it will engage the first level fixed contact pair 69. When the cap is moved to the second level, a movable roller contact will also engage the second level fixed contact pair 70. The parts played by those contacts will be described below in connection with the circuitry of FIG. 6.

A typical primary key includes three first level fixed contact pairs and a second level fixed contact pair. The fixed contact pairs and an associated roller contact for each pair are spaced at 90° intervals about the stem axis as best seen in FIG. 5C.

Each of the twenty-five primary keys and the extra key when pressed to the first level produce symbols in a first form, such as formed by solid lines. When pressed to the second level, the impressed symbols may appear in a second form, such as striated, in different color, or underlined. The striated or different color form may be selected by causing an appropriate form or color of ribbon to be interposed between an impressing key and the platen. Underlining may be effected by causing an underline key to strike the ribbon immediately below the area where the symbol impressing key strikes. Other keys may also be depressible to the second level to effect two functions with a single key.

Referring again to FIG. 3 four triangular-shaped keys 74, 76, 78, and 80 surround the primary keys on platform 40. Each of these keys selects specific functions. The regular shift and lock key 74, positioned to be actuated by the thumb, when pressed to the first level, causes the actuated primary key to select the shift of the associated symbol. Thus, if the primary keys selected letters of the alphabet, the shifts would normally be the numbers, punctuation and related symbols, or the upper case of different letters. Depressing the regular shift key 74 to the second level effects the shift hold function which holds the shift position until regular shift and lock key 74 is pressed again to effect release of the shift hold.

The carriage return and margin release key 76 is positioned to be actuated by the middle fingers or edge of the palm. When this key is depressed to the first level, the keyboard may be continuously operated while the carriage returns to the starting margin and the platen is advanced to the next line. This continuous operation feature is a result of incorporating storage while the carriage is returned and then impressing the stored symbols rapidly when the carriage and platen are in a position to receive the next line of symbols.

When the carriage return and margin release key 76 is pressed to the second level, it may function as a margin release to allow the carriage to move past a predetermined left margin normally selected in accordance with conventional typewriter techniques, thus positioning the platen for a speaker's name or a paragraph number, etc., outside the starting margin.

Back space and index key 78 is arranged ot be actuated normally by the little finger. When pressed to the first level, it functions as a conventional back space to retard the carriage by one symbol position. When depressed to the second level, it additionally functions to index the platen to the next line to tab.

The keyboard lockout and lock key 80 is arranged for actuation by the middle fingers. When pressed to the first level, this key functions to disable that keyboard so that the impressions will be controlled solely by the other keyboard. By pressing key 80 to the second level, this keyboard lockout function is maintained until the key is again depressed.

Auxiliary shift and lock key 82 functions to select a third shift level. Hence, each primary key may select one of three symbols depending on the state of the shift keys. When pressed to the second level, key 82 locks the apparatus to the third shift level until pressed again. Key 82 is positioned to be depressed by the thumb.

Auxiliary space and underline key 84 is positioned for convenient actuation by the thumb. When pressed to the first level, it selects the function of a conventional typewriter space for advancing the carriage one space. When depressed to the second level, it may perform the function of underlining.

Auxiliary carriage return and margin release key 86 is positioned for actuation by the middle fingers or edge of the palm. When depressed to the first level, it serves as does key 76 to return platen to starting margin but with an advancement less than that associated with key 76. When depressed to the second level, it may function as a margin release enabling the carriage to return to the left of the preselected margin and reach the normal left machine margin, thus laterally positioning the platen as does the return key 76 pressed to second level.

The common auxiliary keys 26 may be depressed by thumbs and index fingers on either hand or both. Below these, the repeat key 88 may be depressed to cause a symbol selected by a primary key to be repeated until the repeat key is released. When this key is pressed to the second level, it may perform other functions; for example, lowering the ribbon so that the machine may be used for cutting stencils.

The remaining common auxiliary keys designated by the numbers 1–5 may be arranged to perform a number of different functions; for example, causing the platen to advance continuously, as tab selection keys, margin release, fractional advance, and other particular functions desirable for a specific application.

Key 1 may function as a retard key for turning paper on the platen back upon the feed roller 39, if the machine is so equipped, or simply, in the case of the single sheet feed type, back toward the top of the page. Depressing this key to the first level retards but one line while pressing to the second level repeats the function of the key when depressed to the first level until released.

Key 2 may be a forwarding key for moving the carriage in the direction of writing when pressed to the first level. When depressed to the second level, this key functions as a running tab extractor.

Key 3 functions as a margin release, tab and, if the machine is equipped with platen retard key 1 and advance key 5, the fractional advance or retard, a feature useful in impressing subscripts and superscripts. This key works in conjunction with keys 2 and 4 to effect tabulation. When this key is depressed to the second level, it functions as a tab insert.

Key 4 may function as a reversing key for causing the carriage to move in the direction opposite to that of the writing when pressed to the first level. When depressed to the second level, it may function as a running tab extractor. If keys 2 and 4 are simultaneously depressed, the carriage motor is deenergized so that vertical writing in conjunction with the retard or advance keys 1 and 5 may be achieved. The means for achieving this carriage motor deenergization is described below in connection with explaining FIG. 14.

Key 5 may function as an advance key for moving the platen a line in a direction opposite to that associated with key 1 when depressed to the first level. When depressed to the second level, it performs the same function repeatedly until released.

The exemplary embodiment also preferably includes a master switch 87 for selecting the various modes of operation. The usual position of this switch when operating is in the RN, or right normal, position shown in which the new symbols are impressed to the right of previous symbols on a line.

In the C or center position, a stop may be raised to bring the carriage to the point midway between the left and right margin of the machine.

With the master switch 87 in the LN, or left normal position, symbols are impressed to the left of previously impressed symbols. This mode of operation is advantageous when transcribing in alphabets, such as Hebrew, which are read from right to left. Another use of this mode is for tabulating figures. By commencing impressing digits in their order of increasing significance as from the decimal point, columnar alignment is easily maintained. Normally one keyboard, left or right, is disabled when the machine is so employed.

The RE, or right emphatic, and LE, or left emphatic, positions correspond to the RN and LN positions, respectively, except that all symbols are impressed with emphasis, such as being underlined, appearing in an emphatic color, or appearing in striated form, capitals, or otherwise differentiated symbols.

The remaining position is the Off Close position which disables the apparatus.

The specific techniques for achieving the functions selected by master switch 87 are well within the skill of those having ordinary skill in the typewriter art; therefore, the details of switch connections and other means for effecting these functions are not discussed further to avoid obscuring the principles of the invention.

Referring to FIG. 6, there is shown the logical arrangement of switch terminals closed by the switches associated with the different primary keys. To avoid obscuring the principles of operation, only a single typical key switch is shown connected to appropriate terminals. Basically the keys return terminals in four control circuits to a through or main line. These control circuits include the vertical circuit terminals 101, the horizontal circuit terminals 102, the lght circuit terminals 103 and the lower circuit terminals 104. The vertical and horizontal circuit terminals comprise means for selecting the printing of a specific symbol identified by a digital number which in this specific system includes up to two digits of radix five. One of these digits is the vertical or V digit and the other is the horizontal or H digit. The finite values of the V digits correspond to V1–V4 and the finite values of the H digit correspond to H1–H4 on the primary keys (FIG. 3). Depressing a primary key may actuate a switch, such as switch 105, to close horizontal contacts such as 106 and vertical contacts, such as 107, to connect the through line 108 bearing key power to terminals V4 and H4. In the specific embodiment shown, there are effectively five switches connected in parallel for each of the four finite values so that depression of a key associated with that value connects through line 108 to the correspondingly designated terminal.

The light circuit terminals 103 are arranged to couple power from main line 126 as check print signals to ignite one of the light bulbs 109 corresponding to the lettered row of the depressed key. Thus, when contacts 113 are closed, the *a* bulb is lit. Typically the thumb and fingers are respectively assigned rows *a*, *b*, *c*, *d*, *e*, and the ignition of more than one bulb will always indicate the simultaneous selection in one set, left or right, of more than one character, a condition that can be readily detected through photoelectric means to prevent the impression of any symbol when a multiple selection is inadvertently made, and, when voluntary, serve as the space key as described below.

Should a key be depressed all the way so that lower switch contacts 114 are closed, output terminals 115 and 116 of the lower circuit terminals are effectively connected together to effect control functions described below.

Before considering the combined block-schematic circuit diagram illustrating the logical arrangement of the encoding system for a specific embodiment of the invention, a schematic circuit diagram of a cricut suitable for functioning as the various gating circuits in the encoding system will be described. Referring to FIG. 8, there is shown such a circuit for providing the H4 level on the H output line, common to all the H gating circuits, when one of the keys in the uppermost row of the primary keys is pressed to connect through line 108 to the H4 terminal. Each gate comprises a solenoid like 110 that is energized when the H4 terminal is connected to the through line 108 to close the hold contacts 111 and the cue contacts 112, typically comprising magnetic reed switches as shown. With hold contacts 111 closed, solenoid 110 remains energized even after the H4 terminal is disconnected from through line 108 to keep the cue contacts 112 connecting the H4 level line to the H output line until the power on the hold line is interrupted to deenergize solenoid 110 and allow hold contacts 111 and cue contacts 112 to open again.

Referring to FIG. 7, there is shown a combined block-schematic circuit diagram illustrating the logical arrangement of the encoding system for a specific embodiment of the invention. There are two essentially identical systems, one on the left side of the drawing associated with the left-hand keyboard 22 and one on the right side of the figure associated with the right-hand keyboard 24.

The description which follows describes either system and identifies duplicated elements by a reference numeral alone to refer to both the element bearing the reference numeral with an appended L on the left side and the element bearing the reference numeral with an appended R on the right side.

Each of the horizontal groups includes four cue gating circuits designated H1–H4 for providing the corresponding H level when conditioned and a fifth cue gating circuit associated with the extra key, designated EK, for providing a fifth finite level on H output line 121 when the extra key 44 on the keyboard is depressed to condition that gate. The H output line 121 will bear a potential corresponding to the enabled one of the EK and H cue gates. An H cue gate is conditioned when any of the five parallel terminal pairs in an associated horizontal circuit terminal group 102 is closed. But that conditioned gate is not enabled until the associated voltage divider 122 receives a prescribed current over cue line 123 through switched cue current switch 124 which is activated in a manner to be described below.

The normal operation of the invention involves selecting symbols for printing from the left keyboard 22 and right keyboard 24 (FIG. 3) alternately or simultaneously. The encoding system in FIG. 7 is normally arranged to provide signals to effect printing only after a left keyboard selection is followed or accompanied by a right keyboard selection to cause the coupler unit to close the cue current switch 124 to deliver current to the cue line 123 and provide an output level on the H output line 121, the V output line 143, the space output line 145 and the shift output line 152.

To this end, depression of a key on the left keyboard causes key power from the source 125 to flow over main line 126 through the left A solenoid coil 127 to through line 108L, thereby opening normally closed contacts 127*a* and closing normally open contacts 127*b*. Closed contacts 127*b* carry current to the left B solenoid 131 from main line 126 which closes normally open holding contacts 131*a* and normally open contacts 131*b*. At this time normally closed breaker switch contacts 132 couple energy from main line 126 to hold line 133 which delivers energy through various holding contacts in the system, such as holding contacts 131*a*, to various solenoids, such as the left B solenoid 131. Upon releasing the key the path over through line 108L is opened to deenergize solenoid 127 and allow contacts 127*a* and 127*b* to return to the normally closed and normally open positions, respectively. At this time cue switch biasing source 134 cannot yet trigger the cue current switch 124 because the pair of contacts 135*b* associated with the right B solenoid 135 are open.

Now upon depression of a key from the right keyboard 24 energy is coupled from key power source 125 over main line 126 through right A solenoid 136 to the right through line 108R to energize that solenoid and open normally closed contacts 136*a* and close normally open contacts 136*b*. Energy from main line 126 is then coupled through contacts 136*b* to the right B solenoid 135 to close normally open holding contacts 135*a* and the normally open contacts 135*b*. This still does not trigger cue current switch 124 because contacts 136*a* are open until the key on the right keyboard is released. Releasing that key interrupts the flow of current over through line 108R and through right A solenoid 136 to allow the return of contacts 136*a* to the normally closed position and complete the path from cue switch bias source 134 to the cue switch 124, thereby triggering cue switch 124 which connects current from cue power source 137 to the cue line 123. Cue switch bias source also energizes normalize switch 156 which conducts current from main line 126 so as to energize break solenoid 141 and open the normally closed breaker switch contacts 132 to hold line 133. This interruption returns all equipment to the normal position in readiness for receiving another pair of key selections. This interruption also deenergizes the B solenoids 131 and 135 so that contacts 131*a*, 131*b*, 135*a* and 135*b* return to their normally open position, removing the biasing signal from cue current switch 124 to open that switch and remove the cue signals on cue line 123 to provide synchronous fixed level pulses on the various output lines representative of the immediately preceding selections made on the left and right keyboards.

The vertical group comprises four gates designated V1—V4 which provide, when enabled, an appropriate level from precision divider 142 and provide that level on the V output line 143. These levels could be derived from a divider common to the other groups.

Depression of the middle key M closes terminals 144 to draw current through line 108 and in effect designate a symbol represented by the two digit number corresponding to zero levels on H output line 121 and V output line 143.

The space group includes four cue gates designated BS, ES1, ES2 and LF for designating the backspace function, two end-space functions (for index and carriage return keys) and light-form function, respectively, by an appropriate level coupled to space output line 145. The BS gate is conditioned by depression of the backspace key 78 on the keyboard, the ES2 gate is conditioned by depression of the carriage return and margin release key 76 and the ES1 gate is conditioned by depression of the auxiliary carriage return and margin release key 86 or backspace key 78 to the second level, the latter key being coactive with the tab stop lever. The light-form gate LF is conditioned by depression of a primary key to the lower level to close a lower switch such as 114 (FIG. 6) in the lower circuit 104 and thus connect terminal 115 to terminal 116 to deliver a conditioning signal through contacts 151*a* of shift cutoff switch solenoid 151 to LF gate.

The remaining group comprises the shift group which normally provides a middle shift level from voltage divider 150 corresponding to the middle shift position transmitted over the path including normally closed contacts 151*d*, 153, 154*c* and 155*c*. Depressing the regular shift key 74 energizes regular shift solenoid 154 to open normally closed contacts 154*c* and thereby interrupt the path for connecting the middle shift level from voltage divider 150 to shift output line 152, to close holding contacts 154*b* to keep solenoid 154 energized as long as hold line 133 remains energized, and to close normally open contacts 154*a* to complete the path for providing the regular shift level on shift output line 152.

Depressing auxiliary shift and lock key 82 energizes auxiliary shift solenoid 155 to open normally closed contacts 155*c* and thereby interrupt the path connecting the regular shift key from voltage divider 150 to shift output line 152, to close normally open holding contacts 155*b* to keep auxiliary shift solenoid 155 energized so long as hold line 133 is energized, and to close normally open contacts 155*a* to complete the path for transmitting the auxiliary shift level from voltage divider 150 to shift output line 152.

Underlining may be effected by pressing two or more keys in different rows of the same hand to condition the UL cue gate in the following manner. When two or more keys are pressed, two or more of the bulbs 109 are lit to reduce the resistance of photocell threshold switch 161 to such an extent that power from main line 126 is applied to solenoid 151 to energize that solenoid to close normally open contacts 151*c* and connect the main line energy on line 126 through terminals 115 and 116 connected by pressing to the second level to condition the UL gate and allow that gate to connect the underline level from voltage divider 150 to shift output line 152.

With a photocell threshold switch 161 closed upon sensing the light output from two or more of the light bulbs 109, solenoid 151 is energized to open normally closed contacts 151*a* and 151*d* and close the normally open contacts 151*b* and 151*c*. The opening of contacts 151*a* prevents the light-form gate LF from being conditioned while the closing of contacts 151*b* connects solenoid 151 to hold line 133 to keep that solenoid energized when the keys are released. The opening of contacts 151*d* prevents line 152 from providing a shift signal necessary to effect printing. Thus, simultaneous depression of two primary keys from two finger rows on a keyboard will prevent the provision of a shift signal on shift line 152 and thereby prevent printing. The closing of contacts 151*c* enables the underline gate UL to provide an underline level on shift line 152 when a key is depressed to the lower level connecting terminals 115 and 116.

Underlining may also be effected by pressing auxiliary space and underline key 84 to the second level to close normally open contacts 84*a* and 84*b*. Closed contacts 84*a* condition the V1 gate while closed contacts 84*b* energize solenoid 151 to connect the underline level in a manner similar to that just described.

Depressing keyboard lockout and lock key 80 mechanically opens contacts 153 and closes one of contacts 131*b* and 135*b*, thereby allowing symbols for impression to be selected from only one of the keyboards. The interruption of the shift line prevents the generation of shift signals from the associated keyboard encoding circuitry necessary to effect imprinting.

When cue current switch 124 is triggered, normalize switch 156 is also energized and responds after a predetermined interval to connect main line 156 to break solenoid 141 which opens normally closed contacts 132 to remove the hold signal from hold line 133 and allow all the solenoids energized from that line to become deenergized and release their associated contacts to their normal positions.

Depressing key 74, when locked, for release mechanically interrupts normalizing contacts 158 to deenergize the regular and auxiliary shift solenoids 154 and 155 and allow the middle shift level to be coupled to shift output line 152.

Referring to FIG. 9, there is shown a combined block-pictorial-schematic circuit diagram of a decoding system according to the invention for accepting the encoded signals provided on output lines 121, 143, 145 and 152 and providing appropriate control signals to actuate the printing mechanism.

The signals from the left and right group of lines are simultaneously recorded on a rotating magnetic drum 172 by a left group of recording heads 173 and a right group of recording heads 174 along four parallel tracks so that the space signals are recorded on the upper track, the vertical signals on the second track, the horizontal signals on the third track and the shift signals on the lower track. A single column of readout heads 175 then scan left and right data in sequence to effect actuation in sequence of the operations previously designated by the left and right keyboards.

The drum 172 is normally driven at essentially constant velocity in clockwise direction by the constant speed motor 176 through an idler wheel 177. The readout heads 175 may be rotated about the perihpery of drum 172 when the head mount 181 is driven by the end-space motor 182 in a manner described below.

The readout amplifiers 183 amplify the levels read out from the respective heads to provide the shift level on shift line 184, the V level on V line 185, the H level on H line 186 and the space level on space line 187.

The shift, V, H and space signals control respectively the shift decoding group 191, the V decoding group 192, the H decoding group 193 and the space decoding group 194. The different relays in each group are so biased that the higher relays require more signal level for actuation than an immediately lower relay and the circuitry is so arranged that actuation of a higher relay directs power from power source 195 over a path determined by the most heavily biased relay actuated. This will be better understood by considering a more detailed discussion of the operation.

Consider first the shift group 191, for the H and V groups 193 and 192 can deliver no power to clutch solenoids of the printer unless the group receives a shift signal. The underline solenoid 201 can provide no power from power source 195 to the underline actuator 202 if any of middle solenoid 203, down solenoid 204 or up solenoid 205 are energized. Consider the situation where the middle signal level is received on shift line 184, a level sufficient to actuate solenoids 201 and 203 but insufficient to actuate solenoids 204 and 205. Since the latter two solenoids remain deenergized, the normally open contacts **204*b* and 205*b* remain open, and the normally closed contacts 204*a* and 205*a* remain closed. Since solenoid 203 is energized, the normally closed contacts 203*a* open to prevent power from being delivered to the underline actuator 202, even though energized solenoid 201 causes the closing of normally open contacts 201*b***.

Underline actuator 202 may respond to all shift signals by moving dial 87 to the LE or RE positions to close switch 199.

Normally open contacts **203*b* close to deliver power to the middle shift line 206 to put the keybars in the middle shift position and on through the actuator unlocking solenoid 200 to power line 207. In a similar manner a highest level signal would actuate solenoid 205 and energize the up line 208 of shift solenoid 261 and locking solenoid 200. The presence of the next higher level would energize down line 211 and unlocking solenoid 200, also providing, in the latter two cases, energy on power line 207**. When any of the shift lock functions are selected, the corresponding shift keyboard selecting contacts remain closed until unlocked at the keyboard.

Operation of the solenoids in the space group 194, the V group 192 and the H group 193 is in a similar manner. However, the H group functions to connect one of five output lines H0–H4 to ground while the V group 192 functions to connect one of associated lines V0–V4 to the power line 207. Each symbol actuator may then comprise a solenoid having one end connected to one of the lines V0–V4 and the other end connected to one of the output lines H0–H4 to be actuated only when the one end is connected to power line 207 and the other end connected to ground.

The space group 194 functions in a similar manner to drive the single advance actuator 211, the economy advance actuator 212, back space actuator 213 and the light form actuator 214 upon receipt of the appropriate designating level on the space line 187.

Energization of power line 207 activates space switch 218. The presence of a finite potential on V line 185 or on H line 186 also activates the space switch.

Upon the activation of the economy advance or single advance actuators 211 and 212, start switch 221 is closed to activate the end space motor switch 222 which then causes end space motor 182 to move readout head support 181 at the same angular velocity as drum 172 until margin switch 223 senses that the carriage has reached the left margin, at which time it causes the end space motor switch 222 to reverse the direction of rotation of end space motor 182 and move the readout heads carried by member 181 back toward normal position, thereby reading out the data that was stored on the drum while the carriage was being returned to the left margin. Thus, the operator may continue to select symbols during the period the carriage is returned. The levels recorded differ sufficiently in amplitude so that variations in readout head output level occurring while member 181 moves is not enough to produce an erroneous level designation on any of lines 184, 185, 186 or 187.

A right margin switch 178 actuates stop switch 179 to deenergize motor 176 when the right margin is reached. As an alternative, right margin switch 178 may operate in parallel with start switch 221 to automatically activate end space motor switch 222 and permit automatic carriage return when, after the warning bell signifying the approach of the end of line, space is struck. With a long word a space struck after the hyphen achieves the same result and will permit writing to the margin or, if margin release is also conditioned, the machine margin.

Referring to FIG. 10, there is shown a perspective view of an underlining bar with associated actuator especially suitable for use in apparatus according to the invention. Energization of underline solenoid 231 forces the underline 232 toward the platen, the underline stem 233 being pivotably mounted about axis 234. A stem guide 235 keeps stem 233 in lateral alignment and includes an alignment tooth opening hole 236 for receiving an alignment tooth from an actuated keybar bearing a symbol selected for impression. Stem guide 235 may also be seen in part in FIG. 2.

Referring to FIG. 11, there is shown a side view illustrating the relationship among elements including the underline assembly and actuated keybar in an exemplary embodiment of the invention. A typical keybar 241 is shown in the middle position about to strike the ribbon 242 to produce an impression on the paper 243 of the symbol carried on the middle leg 244 of keybar 241.

Alignment tooth 245 of keybar 241 is then located in alignment tooth opening 236 in stem guide 235 so that upon energization of underline solenoid 231, the underline would appear on paper 243 immediately below the impressed symbol. Should the upper shift have been selected, keybar 241 would be positioned with the lower leg 246 above underline 232. Should the lower shift have been so selected, upper leg 251 of keybar 241 would be just above underline 232. Thus, regardless of which of the three symbols on a keybar is selected for impressing paper 243, the underline 232 is always in a position to be impressed immediately beneath the selected symbol.

Referring to FIG. 12, there is shown a portion of ribbon 242 in which the upper portion 253 is solid and the lower portion 254 is striated so that actuation of the ribbon raise mechanism in response to the condition of light form solenoid 214 may in one case produce solid symbols and in the other case produce striated symbols. Of course, color differentiated symbols will be struck if the two portions of the ribbon are of different colors.

Referring to FIG. 13, there is shown a view of a suitable mechanism for effecting shifting by moving the keybar supporting means up or down from the normal middle position. A shift lever 255 moves the keybar supporting means up and down from the normal middle position shown as shift pinion 256 is rotated in response to upward or downward movement of shift rack 257 in accordance with the condition of energization of shift solenoid 261. The shift plunger 262 is formed with an upper end cap 263 that resides in a normal middle position shown as a result of the upper spring 264 pressing downward on an upper piston 265 and a lower spring 266 pressing against the lower piston 267 surrounding the upper portion of plunger 262 so that the plunger can slide upward against the restraining force exerted by upper spring 264 when shift solenoid 261 is appropriately energized.

Shift plunger 262 is also formed with an indexing member 263 formed with a detent 264 for receiving the tapered end of locking pin 265 when in the middle position. Indexing member 263 is also formed with an upper sloping surface 266 for mating with the bottom sloping surface of locking pin 265 when plunger 262 is locked in the down shift position and a lower sloping surface 267 for mating with the upper surface of locking pin 265 when shift plunger 262 is locked in the up shift position.

Energizing up shift line 208 causes plunger 262 to move upward and energizing down shift line 211 causes plunger 262 to move downward. Energization of either of lines 208 or 211 is accompanied by energization of unlocking solenoid 200, causing locking pin 265 to reciprocate.

Referring to FIG. 14, there is shown the means for preventing contradictory instructions from being transmitted to the motors that advance and retard the platen and the carriage when two center keys, such as keys 2 and 4, are simultaneously depressed. Each such pair of keys includes a pair of normally closed switches, such as switches 281 and 282 connected in parallel with terminals 283 and 289, which terminals are in series with the power line to an associated motor. Depressing only one key leaves one of switches 281 and 282 completing the path for delivering power to the associated motor. But pressing both keys opens both switches 281 and 282 to prevent the associated motor from receiving power.

Referring to FIG. 15A, there is shown a preferred arrangement of the right hand keyboard selections available when right regular shift is pressed. FIG. 15B illustrates several of the possible combined symbols made of shift and number forms, several typical Roman numerals and the letters of the Roman alphabet, several of the latter being made by combining various keys in a single space. For example, the letter X is produced by selecting one of the slants shown in 15A, the backspace, and then the other slant.

Referring to FIG. 16, there is shown a preferred arrangement of the 25 symbols essentially as shown in FIG. 1C. The right hand keyboard for this set of symbols is positionally the mirror image of FIG. 16.

Normally most of the space responses will fall on the column embracing L, N and R unless beginner's space is used.

The following tables show preferred arrangements of the standard alphabet on a typewriter according to the invention to facilitate rapid typing. The space may be achieved by simultaneous depression of any two keys from any two matrix rows of the same set; for example, it will be achieved when a key from row *b* and another from row *c*, both of the left hand set, are depressed simultaneously. Alternatively, it may be achieved by depressing a primary key to a third level by means requiring the substitution of the adjustment screw 67 (see FIG. 5A) with a shaft or lever spring biased to a third level and operating to complete the beginner's space circuits; or again, it may be achieved by depressing any key to the second level so as to complete such circuits in lieu of the symbol modifying or shift circuits previously described.

TABLE I

J
P V
N C F
B G I H
Q X U T O Z
K A S W
M E R
Y D
L

TABLE II

/
! (
+ ¢ '
, ? . 2
% : $ - 1 7
) ; 0 6
" 9 5
8 4
3

NOTE.—Plus sign may be modified to serve also as the asterisk.
NOTE.—2 and 8 may be stylized so as to combine as the ampersand.

The illustrated arrangement is for the left hand only, it being understood that the right hand keyboard is the mirror image of the left hand keyboard. The lower case of the letters shown in Table I is normally selected when a key is pressed and the keybars are in the middle shift position. Depressing the auxiliary shift key normally results in the selection of the upper case letters shown in Table I. Depression of the regular shift key results in selection of the punctuation and numerals shown in Table II.

The extra key is not absolutely necessary, for example, the "q" may be put in the position of the exclamation point and "Q" in place of the plus sign or made as a combined form of "O" and the comma. Where simplification is permissible, as in a teletypewriter, the "U" may be dropped entirely and written as "V"; or a letter such as "Q" may be written phonetically, as for example, "KW," and therefore dropped entirely from the manual. On the other hand, although the isomophoric font does not require the use of the extra key, such a key is useful for obtaining a number of Roman letters, as for the purpose of outlining, without resorting to combining one letter or symbol with another.

The philosophy of the present invention differs markedly from that of a standard typewriter. Instead of learning two unlike halves of a keyboard requiring pressing one key after the other, the present invention involves the learning of two like halves with selections on the left and right keyboards being made simultaneously or in succession as desired.

The following techniques are recommended for learning to use the invention with the isomorphic system illustrated in FIG. 1C or the standard alphabet illustrated in Tables I and II.

Step One: Learn one hand with one of the keyboards disabled first. It is recommended that visual copy should be stressed in learning the standard alphabet in this context so as to develop good spelling habits subconciously from the very beginning. The isomorphic system illustrated in FIG. 1C requires less stress in this area and may be learned almost entirely by listening to recordings of clearly enunciated speech. Unless a person is truly ambidextrous, the weak hand is generally the one which should be used first.

Step Two: Learn the other keyboard with the other hand in the same manner by activating the other keyboard and disabling the first.

Step Three: When either hand can write at about twenty words per minute, start to alternate. Activating both keyboards, select the first letter with a left hand finger, the second with a right hand finger and so on. If conditioned to the use of the thumb for space, press the manual four fingers against the five finger rows, and keep the thumb at or near or over the auxiliary space key. Otherwise, the space may be achieved as described previously, i.e., in the primary set at or close to previous selection.

Step Four: At about forty words per minute the alternations become somewhat annoying, and automatically the hands will start to work with one another rather than one after the other. Again, visual copy should be stressed in learning the keyboard when it is set up for the regular script, but recordings, the pauses between the words of which are at first relatively long, may be used to motivate the acquisition of normal dictation rates. These pauses may then be cut down from lesson to lesson until ordinary sources of speech may be used to maintain dictation skills. It is recommended that visual copy be introduced with the isomorphic keyboard learning so that either the regular or isomorphic copy may be created at rates well over two hundred words per minute.

The average typist may be expected to type sixty-five words per minute on a standard keyboard. The present invention is expected to product a gain of fifteen words per minute from the superior statistical distribution and referential system of the keyboard according to the invention over that of the standard typewriter, an additional gain of eighteen words per minute by employing light touch keys activating electrical power sources for actuating the keys, another sixteen words per minute by writing while the carriage is returning, and another five words per minute from shift simultaniety, better control of paper handling, and other features. With these gains the operating speed on one keyboard for an average operator using only one hand should be approximately one hundred nineteen words per minute. This is over a period of some months doubled by using both hands according to the invention to yield a speed of two hundred thirty-eight words per minute for an average operator. The exceptional typist may be expected to achieve transcription at rates well over 300 words per minute.

If the isomorphic system is employed, the standard alphabet is still available to the operator for such purposes as outlining and spelling proper names traditionally, albeit in a style somewhat novel as represented here. Different styles, of course, may readily be achieved to suit the special tastes of the user.

The more ambidextrous the operator becomes with practice the less the loss resulting from poor coordination is. Moreover, the practical motivation and readily available sources of dictation to keep in practice to achieve a rate sufficient to take down raw utterance is considerably greater in relation to the invention than it is to the standard typewriter.

There have been described especially advantageous apparatus and techniques for signal translation. Numerous alternate mechanisms, coding and decoding techniques may be employed without departing from the principles of the invention. Rendering open contact units wherever possible throughout the system as reed units or in the form of semiconductor switches for such considerations as longevity, lightness and quietness of operation may be effected without departing from the actual invention. Different means may be employed for recording the selected symbols, such as magnetic or paper tape, without departing from the invention. It is evident that those skilled in the art may now make numerous modifications of and departures from the specific apparatus and techniques described herein without departing from the inventive concepts. Consequently, the invention is to be construed as limited solely by the spirit and scope of the appended claims.

What is claimed is:

1. Symbol selection apparatus comprising, a keyboard having a right group of symbol keys and a left group of symbol keys, symbol recording means for recording a group of symbols each of which corresponds to a symbol selectable by a key in said right group of symbol keys and by a complementary key in said left group of symbol keys which complementary keys are mirror images about a plane of symmetry midway between said right group of symbol keys and said left group of symbol keys, means responsive to actuation of said keys for actuating said symbol recording means to record a sequence of said symbols selected by actuation of corresponding ones of said symbol keys, means for receiving a selection of a left selected symbol in response to actuation of a left symbol key simultaneously with a selection of a right selected symbol in response to actuation of a right symbol key, means for delivering a signal representative of said left selected symbol and a signal representative of said right selected symbol to said means for recording in spaced time relationship, said means for receiving comprising left encoding means responsive to actuation of a left group symbol key for providing a left encoded symbol signal and right encoding means responsive to actuation of a right group symbol key for providing a right encoded symbol signal, means responsive to actuation of a single left group symbol key and a single right group symbol key for transmitting both said left encoded symbol signal and said right encoded symbol signal to said means for delivering, said means for delivering comprising, means for storing said left encoded symbol signal and said right encoded symbol signal, decoding means responsive to an encoded symbol signal previously stored in said means for storing for providing a decoded symbol signal representative of a symbol designated by a corresponding previously stored encoded symbol signal, means for transferring a previously stored left encoded symbol signal and a previously stored right encoded symbol signal in sequence to said means for decoding to cause said decoding means to provide in sequence a left decoded symbol signal and a right decoded symbol signal representative of symbols designated by said previously stored left encoded symbol signal and said previously stored right encoded symbol signal respectively, and means for applying said left decoded symbol signal and said right decoded symbol signal to said means for recording to record in sequence the symbol designated by said left group symbol key and the symbol designated by said right group symbol key, said means for recording comprising means for impressing said symbols and platen means for supporting a recording surface for receiving impressions from said means for impressing, said means for impressing and said platen means being relatively movable to permit impression of a sequence of lines of said symbols upon said recording surface, means responsive to said means for impressing and said platen means assuming a relative position corresponding to the end of a line and associated with said means for storing therein pairs of said left encoded and said right encoded symbol signals while the relative position between said means for impressing and said platen means changes from that corresponding to the end of a line to that corresponding to the beginning of the next line and then delivering the last-mentioned pairs to said decoding means to effect recording on said next line of the sequence of symbols represented by said last-mentioned pairs, said means for storing and said means associated with said means for storing comprising, a rotatable magnetic drum, writing head means responsive to said encoded symbol signals for inscribing said encoded symbol signals on said magnetic drum, readout head means relatively movable with respect to said writing head means for scanning said rotatable magnetic drum to recover the previously inscribed encoded symbol signals, and means for moving said readout head means away from said writing head means while the relative position between said means for impressing and said platen means changes from that corresponding to the beginning of the next line to then preclude recovery of previously inscribed encoded symbol signals and then moving said readout head means toward said writing head means to recover all the previously inscribed encoded symbol signals.

2. Symbol selection apparatus in accordance with claim 1 wherein said left encoding means and said right encoding means each comprise switches actuated by said symbol keys, each switch comprising means defining a cylindrical housing having an outer member coaxially surrounding an inner cylindrical member, means for supporting on at least one of said members a plurality of pairs of insulatedly separated contact strips generally parallel to and angularly spaced about the axis of said housing, a corresponding plurality of roller contacts each associated with a respective one of said pairs of contact strips, means including said roller contacts for supporting said inner and outer members for relative movement therebetween along a direction parallel to said axis while preventing movement therebetween in a direction perpendicular therebetween and maintaining the radial distance between said inner and outer members much less than the diameter of said inner member which diameter is slightly less than the inside diameter of said outer member, and means for supporting said roller contacts to permit relative movement between said roller contacts and said pairs of contact strips generally parallel to said axis to selectively connect one contact strip to the other in a pair only when the associated roller contact engages both strips in a pair.

3. Symbol selection apparatus in accordance with claim 2 wherein said roller contacts define a first plane generally perpendicular to said axis, the top edges of one group of said pairs of contact strips defines a second plane generally perpendicular to said axis, the top edges of at least one other pair of said contact strips defines a third plane below said second plane, the length of said pairs of strips being sufficiently long so that when said first plane coincides with said third plane, contact is then established between said at least one other pair of said contact strips while maintaining contact between said pairs of contact strips comprising said one group.

4. Symbol selection apparatus in accordance with claim 1 wherein said left encoding means and said right encoding means each comprise switches actuated by said symbol keys, each switch comprising means defining a cylindrical housing supporting a plurality of pairs of insulatedly separated contact strips generally parallel to and angularly spaced about the axis of said housing, a corresponding plurality of roller contacts each associated with a respective one of said pairs of contact strips, and means for supporting said roller contacts to permit relative movement between said roller contacts and said pairs of contact strips generally parallel to said axis to selectively connect one contact strip to the other in a pair only when the associated roller contact engages both strips in a pair.

5. Symbol selection apparatus in accordance with claim 4 wherein said roller contacts define a first plane generally perpendicular to said axis, the top edges of one group of said pairs of contact strips defines a second plane generally perpendicular to said axis, the top edges of at least one other pair of said contact strips defines a third plane below said second plane, the length of said pairs of strips being sufficiently long so that when said first plane coincides with said third plane, contact is then established between said at least one other pair of said contact strips while maintaining contact between said pairs of contact strips comprising said one group.

6. Symbol selection apparatus in accordance with claim 5 and further comprising a source of light energy for each row of said symbol keys, means for coupling energy through a pair of contact strips associated with each symbol key to a light source associated with the row of the respective symbol key, and means responsive to depression of keys in more than one row for illuminating simultaneously a plurality of said light sources to provide a disabling signal preventing said means for recording from recording a symbol which otherwise would have been recorded had a symbol key in but one row had instead been depressed.

7. Symbol selection apparatus in accordance with claim 6 wherein said means for impressing comprises, a plurality of type bars each having three vertically displaced symbols thereon, means for positioning each type bar in up, middle and down shift positions relative to said platen means when the type bar abuts said platen means to then impress selectively the upper, middle and lower ones of said three vertically desplaced symbols respectively upon striking a recording surface separating the type bar from said platen means, said means for positioning comprising shift lever means and a solenoid having an electrically actuable shaft movable upward and downward from a neutral position for positioning said shift lever means, and spring biasing means comprising a first spring means urging said shaft downward and a second spring means urging said shaft upward to normally maintain said shaft in said neutral position, and means for applying up and down signals to said solenoid to move said shaft upward and downward respectively.

8. Symbol selection apparatus in accordance with claim 7 and further comprising locking pin means for maintaining said shaft in one of the up and down positions, and means for releasing said locking pin upon selection of the middle shift position to cause said shaft to assume said neutral position.

9. Symbol selection apparatus in accordance with claim 8 wherein said locking pin means functions for maintaining said shaft in one of the up, down and neutral positions, and said means for releasing includes means for releasing said locking pin upon selection of any of said up, down and middle shift positions.

10. Symbol selection apparatus comprising,
a plurality of symbol keys defining a keyboard,
said plurality corresponding to the number of symbols in a family of symbols sufficiently large to represent substantially all the sounds in a predetermined language,
the location of said symbol keys corresponding to the isomorphic distribution of humanly uttered sounds with keys corresponding to vowel sounds grouped contiguously in a first portion of said keyboard,
keys corresponding to consonant sounds grouped contiguously in a second portion of said keyboard,
keys corresponding to glide sounds grouped contiguously in a third portion of said keyboard,
symbol recording means for recording a group of symbols each of which corresponds to a symbol selectable by a symbol key,
and means responsive to actuation of said symbol keys for actuating said symbol recording means to record a sequence of said symbols selected by actuation of corresponding ones of said symbol keys said symbol keys being arranged in a plurality of rows,
said means responsive to actuation of said symbol keys including means responsive to simultaneous actuation of keys in more than one of said rows for preventing said symbol recording means from recording a symbol and causing said symbol recording means to record a space whereby the operator may deliberately select a space between symbols by simultaneously depressing symbol keys in two different rows.

11. Symbol selection apparatus in accordance with claim 10 wherein said third portion separates and is contiguous with said first and second portions.

12. Symbol selection apparatus in accordance with claim 10 wherein said means responsive to actuation of said symbol keys includes means for recording an additional element in a symbol space,
element selecting means associated with said keyboard for continuously selecting said element for recording in each symbol space,
and means responsive to actuation of said element selecting means for recording said additional element in each symbol space in response to each actuation of a symbol key.

13. Symbol selection apparatus in accordance with claim 12 wherein said element is an underline.

14. Symbol selection apparatus comprising,
a keyboard having a right group of symbol keys and a left group of symbol keys,
there being as many symbol keys in each of said left and right groups as there are symbols in a family of symbols sufficiently large to represent substantially all the sounds in a predetermined language whereby a pair of successive symbols for recording may be simultaneously selected regardless of the sounds represented thereby upon substantially simultaneous actuation of a left symbol key and a right symbol key,
symbol recording means for recording a group of symbols each of which corresponds to a symbol selectable by a key in said right group of symbol keys and by a complementary key in said left group of symbol keys which complementary keys are mirror images about a plane of symmetry midway between said right group of symbol keys and said left group of symbol keys,
means responsive to actuation of said keys for actuating said symbol recording means to record a sequence of said symbols selected by actuation of corresponding ones of said symbol keys,
said means responsive to actuation of said keys including means responsive to substantially simultaneous actuation of a pair of keys consisting of a left symbol key and a right symbol key for actuating said symbol recording means to record in the same selected sequence the symbol associated with the left symbol key and the symbol associated with the right symbol key regardless of which of said pair of keys was first actuated,
said means responsive to actuation of said keys further comprising,
means for receiving a selection of a left selected symbol in response to actuation of a left symbol key simultaneously with a selection of a right selected symbol in response to actuation of a right symbol key,
means responsive to selection of a pair consisting of both a left selected symbol and a right selected symbol for delivering a signal representative of said left selected symbol and a signal representative of said right selected symbol to said means for recording in spaced time relationship,
said means for receiving comprising,
left encoding means responsive to actuation of a left group symbol key for providing a left encoded symbol signal and right encoding means responsive to actuation of a right group symbol key for providing a right encoded symbol signal and further comprising,
means responsive to actuation of a single left group symbol key and a single right group symbol key for transmitting both said left encoded symbol signal and said right encoded symbol signal to said means for delivering,
said means for delivering comprising means for storing said left encoded symbol signal and said right encoded symbol signal,
decoding means responsive to an encoded symbol signal previously stored in said means for storing for providing a decoded symbol signal representative of a symbol designated by a corresponding previously stored encoded symbol signal,
means for transferring a previously stored left encoded symbol signal and a previously stored right encoded symbol signal in sequence to said means for decoding to cause said decoding means to provide in sequence a left decoded symbol and a right decoded symbol signal representative of symbols designated by said previously stored left encoded symbol signal and said previously stored right encoded symbol signal respectively,
and means for applying said left decoded symbol signal and said right decoded symbol signal to said means for recording to record in sequence the symbol designated by said a left group symbol key and the symbol designated by said a right group symbol key.

15. Symbol selection apparatus in accordance with claim 14 wherein said means for recording comprises means for impressing said symbols and platen means for supporting a recording surface for receiving impressions from said means for impressing,
said means for impressing and said platen means being relatively movable to permit impression of a sequence of lines of said symbols upon said recording surface and further comprising,
means responsive to said means for impressing and said platen means assuming a relative position corresponding to the end of a line and associated with said means for storing therein pairs of said left encoded and said right encoded symbol signals while the relative position between said means for impressing and said platen means changes from that corresponding to the end of a line to that corresponding to the beginning of the next line and then delivering the last mentioned pairs to said decoding means to effect recording on said next line of the sequence of symbols represented by said last-mentioned pairs.

16. Symbol selection apparatus comprising,
a keyboard having a right group of symbol keys and a left group of symbol keys, there being as many symbol keys in each of said left and right groups as there are symbols in a family of symbols sufficiently large to represent substantially all the sounds in a predetermined language whereby a pair of successive symbols for recording may be simultaneously selected regardless of the sounds represented thereby upon substantially simultaneous actuation of a left symbol key and a right symbol key, symbol recording means for recording a group of symbols each of which corresponds to a symbol selectable by a key in said right group of symbol keys and by a complementary key in said left group of symbol keys which complementary keys are mirror images about a plane of symmetry midway between said right group of symbol keys and said left group of symbol keys, and means responsive to actuation of said keys for actuating said symbol recording means to record a sequence of said symbols selected by actuation of corresponding ones of said symbol keys, said means responsive to actuation of said keys including means responsive to substantially simultaneous actuation of a pair of keys consisting of a left symbol key and a right symbol key for actuating said symbol recording means to record in the same selected sequence the symbol associated with the left symbol key and the symbol associated with the right symbol key regardless of which of said pair of keys was first actuated, said means for recording including, means for impressing said symbols and platen means for supporting a recording surface for receiving impressions from said means for impressing, left encoding means responsive to actuation of a left group symbol key for providing a left encoded symbol signal, right encoding means responsive to actuation of a right group symbol key for providing a right encoded symbol signal, an endless magnetic recording medium, writing head means responsive to said left and right encoded symbol signals for inscribing said left and right encoded symbol signals on said magnetic recording medium in contiguous spaced relationship thereon, readout head means for scanning said endless magnetic recording medium to recover the previously inscribed encoded left and right symbol signals in contiguous time-spaced relationship, and means responsive to the output of said readout head means for actuating said means for impressing to record in contiguous spaced relationship the symbols represented by said left encoded symbol signal and said right encoded symbol signal.

17. Symbol selection apparatus in accordance with claim 16 and further comprising, means for supporting said platen means and said means for impressing in relatively movable relationship to permit impression of a sequence of lines upon said recording surface, means including said endless magnetic storage medium and said writing head means responsive to said means for impressing and said platen means assuming a relative position corresponding to the end of a line for storing therein pairs of said left and right encoded symbol signals while the relative position between said means for impressing and said platen means changes from that corresponding to the end of a line to that corresponding to the beginning of the next line and then scanning the last-mentioned pairs with said readout head means to effect recording on said next line of the sequence of symbols represented by said last-mentioned pairs.

18. Symbol selection apparatus in accordance with claim 17 and further comprising, means for supporting said writing head means and said readout head means in relatively movable relationship, and means for moving said readout head means away from said writing head means while the relative position between said means for impressing and said platen means changes from that corresponding to the end of a line to that corresponding to the beginning of the next line to then preclude recovery of previously inscribed encoded symbol signals and then moving said readout head means toward said writing head means to recover all the previously inscribed encoded symbol signals.

19. Symbol selection apparatus comprising, a plurality of symbol keys defining a keyboard, said plurality corresponding to the number of symbols in a family of symbols sufficiently large to represent substantially all the sounds in a predetermined language, the location of said symbol keys corresponding to the isomorphic distribution of humanly uttered sounds with keys corresponding to vowel sounds grouped contiguously in a first portion of said keyboard, keys corresponding to consonant sounds grouped contiguously in a second portion of said keyboard, keys corresponding to glide sounds grouped contiguously in a third portion of said keyboard, symbol recording means for recording a group of symbols each of which corresponds to a symbol selectable by a symbol key, means responsive to actuation of said symbol keys for actuating said symbol recording means to record a sequence of said symbols selected by actuation of corresponding ones of said symbol keys, a multiple level switch associated with each symbol key having at least an upper level corresponding to the normal position of the associated symbol key, an intermediate level corresponding to selection for recording of the associated symbol and a lower level corresponding to selection of a lower level function, and means responsive to depression of the associated symbol key sufficiently to move said multiple level switch to said lower level for activating said lower level function.

20. Symbol selection apparatus in accordance with claim 19 wherein each multiple level switch comprises, means defining a cylindrical housing having an outer member coaxially surrounding an inner cylindrical member, means for supporting on at least one of said members a plurality of pairs of insulatedly separated contact strips generally parallel to and angularly spaced about the axis of said housing, a corresponding plurality of roller contacts each associated with a respective one of said pairs of contact strips, means including said roller contacts for supporting said inner and outer members for relative movement therebetween along a direction parallel to said axis while preventing movement therebetween in a direction perpendicular therebetween and maintaining the radial distance between said inner and outer members much less than the diameter of said inner member which diameter is slightly less than the inside diameter of said outer member, means for supporting said roller contacts to permit relative movement between said roller contacts and said pair of contact strips generally parallel to said axis to selectively connect one contact strip to the other in a pair only when the associated roller contact engages both strips in a pair, means including at least the leading edges of one group of said pairs of contact strips defining an intermediate level plane generally perpendicular to said axis corresponding to a roller contact associated therewith being in said intermediate level plane with said multiple level switch then at the intermediate level, the leading edges of at least one other pair of said contact strips defining a lower plane below said intermediate plane including an associated roller contact when said multiple level switch is at said lower level, the length of said pairs of strips being sufficiently long so that when said switch is actuated to said lower level, contact is then established between said at least one other pair of the said contact strips while maintaining contact between said pairs of contact strips comprising said one group.

References Cited by the Examiner

UNITED STATES PATENTS

| | | | |
|---|---|---|---|
| 676,098 | 6/1901 | Papin | 200—166 |
| 1,378,950 | 5/1921 | Hargan | 197—98 X |
| 1,588,097 | 6/1926 | Dold | 197—9 |
| 1,731,614 | 10/1929 | Etherton | 197—9 |
| 1,767,380 | 6/1930 | Kudrna et al. | 200—166.32 |
| 1,847,538 | 3/1932 | Robenson | 197—98 |
| 2,189,023 | 2/1940 | Ayres | 197—9 |
| 2,196,987 | 4/1940 | Gaston | 197—100 X |
| 2,236,413 | 3/1941 | Pirnat et al. | 197—107 |
| 2,390,414 | 12/1945 | Ayres | 197—9 |
| 2,428,605 | 10/1947 | Ayres | 197—9 |
| 3,026,984 | 3/1962 | Shelton | 197—17 |
| 3,107,771 | 10/1963 | Debus | 197—107 |
| 3,137,774 | 6/1964 | Dow et al. | 200—16 |
| 3,145,270 | 8/1964 | Brown | 200—16 |
| 3,225,883 | 12/1965 | Ayres | 197—11 |

ROBERT E. PULFREY, *Primary Examiner.*

E. S. BURR, *Assistant Examiner.*